Aug. 28, 1928.   1,682,415
J. H. POWRIE
APPARATUS FOR PRODUCING SCREENS FOR COLOR PHOTOGRAPHY
Filed Oct. 30, 1926   5 Sheets-Sheet 1
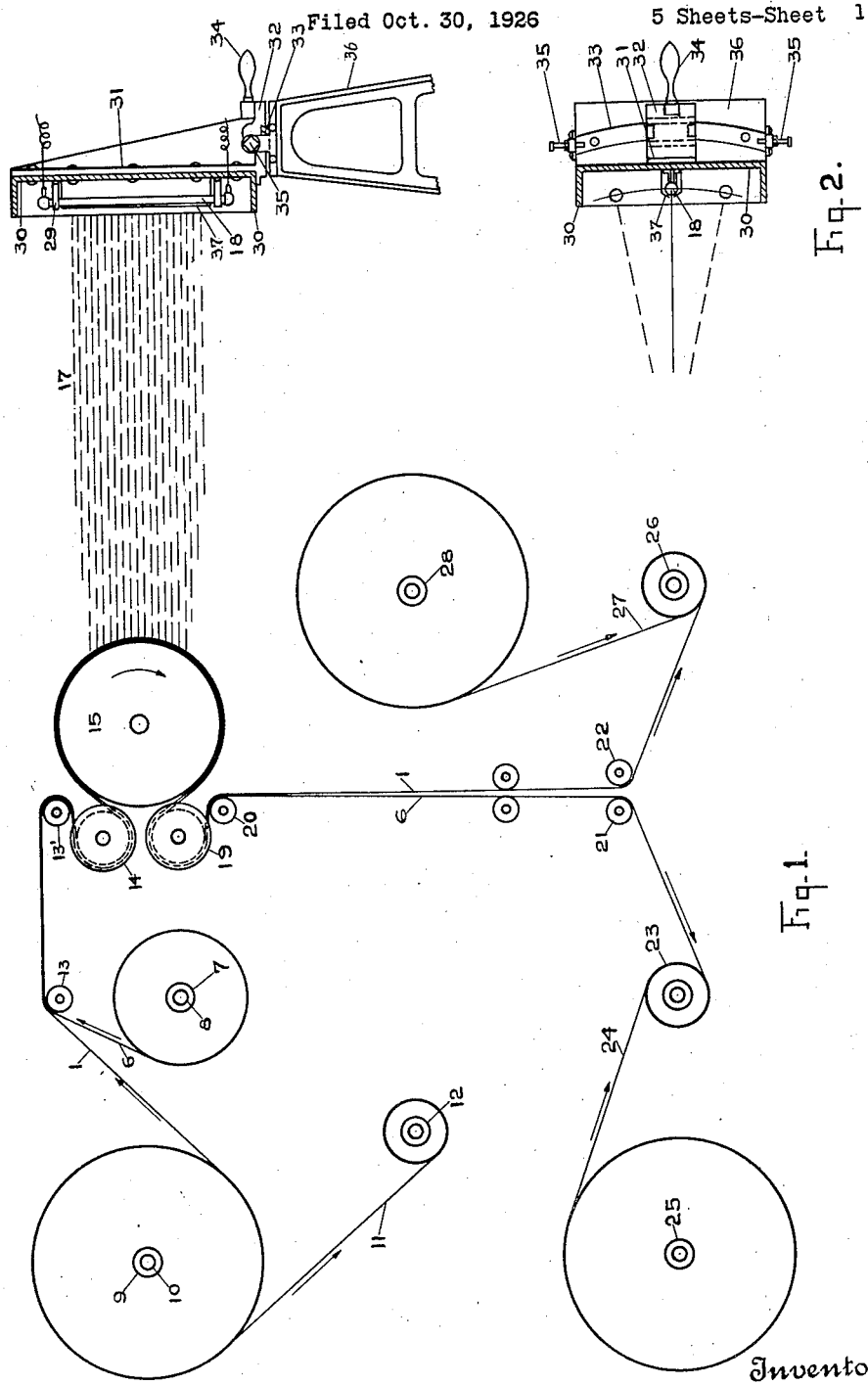

Aug. 28, 1928.  
J. H. POWRIE  
APPARATUS FOR PRODUCING SCREENS FOR COLOR PHOTOGRAPHY  
Filed Oct. 30, 1926     5 Sheets-Sheet 2

1,682,415

Inventor  
John H. Powrie  
By his Attorneys

Aug. 28, 1928.

J. H. POWRIE 1,682,415

APPARATUS FOR PRODUCING SCREENS FOR COLOR PHOTOGRAPHY

Filed Oct. 30, 1926   5 Sheets-Sheet 3

Aug. 28, 1928.　　　　　　　　　　　　　　　　1,682,415
J. H. POWRIE
APPARATUS FOR PRODUCING SCREENS FOR COLOR PHOTOGRAPHY
Filed Oct. 30, 1926　　　　5 Sheets-Sheet 4

Inventor
John H. Powrie
By his Attorneys

Aug. 28, 1928.
J. H. POWRIE
1,682,415
APPARATUS FOR PRODUCING SCREENS FOR COLOR PHOTOGRAPHY
Filed Oct. 30, 1926     5 Sheets-Sheet 5
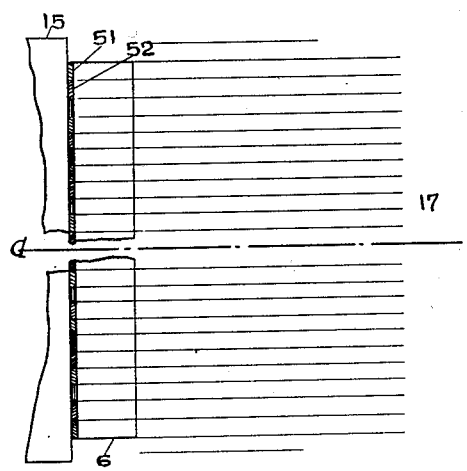
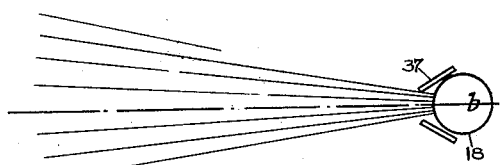
Fig. 14.
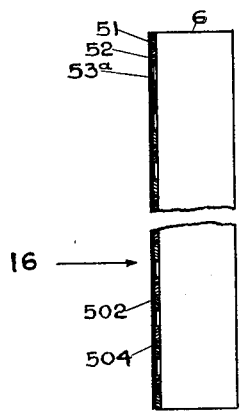
Fig. 15.
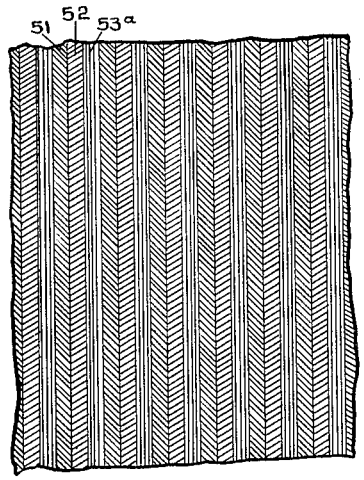
Fig. 16.
Inventor
John H. Powrie
By his Attorneys Patented Aug. 28, 1928.

1,682,415

UNITED STATES PATENT OFFICE.

JOHN H. POWRIE, OF NEW YORK, N. Y.

APPARATUS FOR PRODUCING SCREENS FOR COLOR PHOTOGRAPHY.

Original application filed March 16, 1920, Serial No. 366,198. Divided and this application filed October 30, 1926. Serial No. 145,126.

This invention relates to certain improvements in apparatus for producing continuous screens for use in color photography.

In my Patent No. 1,605,062, dated November 2, 1926, granted on my copending application Serial No. 366,198 filed March 16, 1920 there is disclosed the method of producing a multi-colored screen of long length for use in the production of pictures in natural colors.

This application is a division of the application above referred to, and it has for its especial object the production of an apparatus suitable for photographically printing a continuous screen having a regular recurring pattern of elements which may be colored to produce a color screen suitable for the production of pictures in natural colors.

With this and other objects not specifically referred to, the invention consists in certain novel parts, arrangements and combinations which will be described in connection with the accompanying drawings and the novel features pointed out in the claims hereunto annexed.

In these drawings,—

Figure 1 is a diagrammatic side view, partly in section, of a mechanism by which the photographic printng may be effected;

Figure 2 is a detail plan view, partly in section, of the light source and the means for supporting it;

Figure 8 is a diagrammatic showing of the position of the light during the printing of the first lines on the sensitized face of the film opposite to the sub-master or model carried thereby, the first lines being shown as printed and the lines being shown in edge view;

Figure 14 is a diagrammatic view showing the printing of the third line, and

Figures 15 and 16 are respectively edge and face view of the film having the three lines printed thereon in juxtaposition, Figure 16 being viewed from the direction of the arrow 16 of Figure 15.

Figure 3:
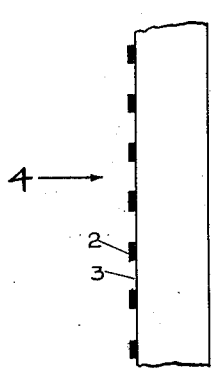
Figure 3 is an edge view on an enlarged scale of the master or model film from which the sub-master model is printed on one side of the film in producing a screen having a pattern of three colored lines.
Figure 4:
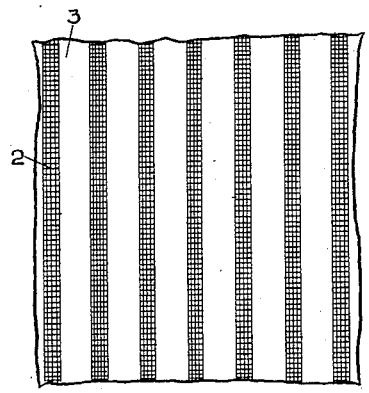
Figure 4 is a face view of the same looking in the direction of the arrow 4 of Fig. 3.

The screen produced by the apparatus which has been selected to illustrate the invention is a flexible film of long length having formed on one surface thereof a regular recurring pattern of parallel colored lines running in the direction of the length of the film, the lines being arranged in recurring groups of three colors, red, blue and green, and this screen is printed from a sub-master formed on the back of the film from a master or model, as described in my application above referred to.

Figure 6:
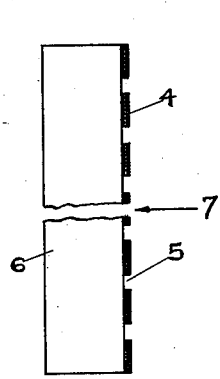
Figures 6 and 7 are edge and face views, respectively, of the film after the sub-master or model has been printed on one side thereof, Figure 7 being viewed in the direction of the arrow 7 of Figure 6.
Figure 7:
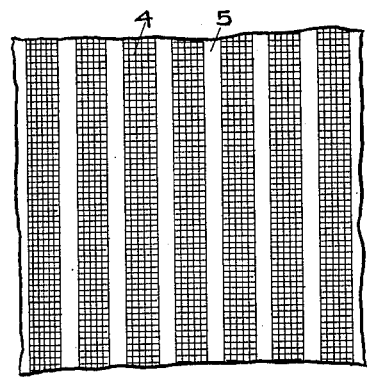

It will be understood, however, that the apparatus illustrated is capable of use in printing the sub-master on the continuous film and for printing a pattern of colored elements other than lines arranged in groups of three. It will be further understood that the apparatus will be capable of printing a pattern on a sensitized support other than a flexible film. Generally speaking, the apparatus includes means for continuously moving the sensitized film past a light source, with the sensitized surface of the film away from the light, and the registration of the lines is effected by utilizing the principle of parallax, the printing being effected through the film, Referring now to the drawings and first to Figures 1 to 7 inclusive, where the film has the lines produced thereon from a sub-master or model carried on one side of the film itself, I produce a three color screen as follows:

A master or model film 1 is employed which has had formed in any suitable manner thereon a series of alternating opaque lines 2 and transparent lines 3, the transparent lines being twice the width of the opaque lines, the lines running in the direction of the length of the film. A plain continuous strip of celluloid or other transparent material which is to form the film of any suitable or desired width within the limits of the master is then coated with a light sensitive coating, as bichromated gelatine and has printed on one side thereof from the master a sub-master or model of opaque lines 4, leaving transparent lines 5, the transparent lines being one-half the width of the opaque lines, this film being indicated by the numeral 6 (see Figs. 6 and 7), it being understood that as shown in Figure 6 the unacted on bichromated gelatin of the lines 5 has been dissolved away in warm water.

This sub-master is printed on the film photographically in any suitable manner, and may be done conveniently in the apparatus illustrated. As shown, the film strip is carried on a reel 7 suitably supported on a stud 8. The master model 1 is carried on a reel 9 supported on a stud 10, and if desired may be wound with an apron 11, which as the master is drawn off may be rolled up on a driven reel 12. The film and the master model are drawn off together over a driven tension roll 13 and a roll 13' by feeding rolls 14 and are passed over a driven printing drum 15, and against the drum are directed rays of light indicated at 17 from a suitable light source, such as a Cooper-Hewitt light marked 18, or if desired an electric arc. During the passage over the drum the opaque lines 4 are printed on one side of the film, the film and the master model leaving the drum over a feeding out roll 19 and passing over a guide 20 and are separated and passed around guide rolls 21 and 22, the film being wound up on a driven reel 23, and preferably to prevent injury to the lines is wound up with an apron 24 supplied from a reel 25. The master model 1 is wound up on a driven reel 26 for re-use and preferably to prevent injury is wound with an apron 27 supplied from a reel 28.

Figure 5:
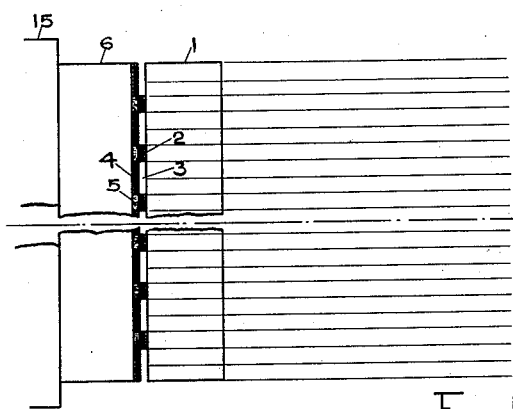
Figure 5 is a diagrammatic showing of the sub-master or model being printed on one side of the film from the master film.

For purposes hereinafter referred to, apparatus constructed in accordance with the invention will include means whereby a relative movement, and preferably a relative angular movement, may be effected between the film to be printed and the light source. As shown, the light 18 is mounted so that it can be moved to cause the light to be thrown at varying angles relatively to the printing drum 15 over which the films pass. While this may be effected in various ways, the light is supported from brackets 29 secured to a bonnet 30. This bonnet 30 is secured to a bracket 31 which has an extension 32, mounted to slide in a curved track 33, a handle 34 being provided for sliding the extension. Adjustable stops 35 may be provided to limit the sliding movement in either direction and the whole device may be supported from a suitable standard 36. There will preferably be provided a light directing device such as shields 37 on each side of the lamp for directing the light rays, as hereinafter referred to. In producing the sub-master or model on the film, the light may be in central position, as shown in Figures 2 and 5, this effecting an even distribution of light over the surface of the film and providing an even printing. The light and shields will be arranged furthermore so as to throw a light beam parallel with the lines which are to be printed thereby.

The film having had the sub-master or model printed on it, as described, is washed and dried, and is then ready to have the first color element as a line printed on the side opposite the sub-master.

In printing the first lines the roll of film is coated on the side opposite the sub-master or model with some light sensitive substance, as bichromated gelatine, and is then run through the machine above described, being supported on the spindle 8 before referred to, the film being run over the exposure cylinder 15 and being printed as it passes over the cylinder by the light 18 before referred to. The film is led to and wound up on spindle 23, and to prevent injury and to afford a support for the film while it is being washed and dried it is wound up with an apron supplied from spindle 25.

Figure 9:
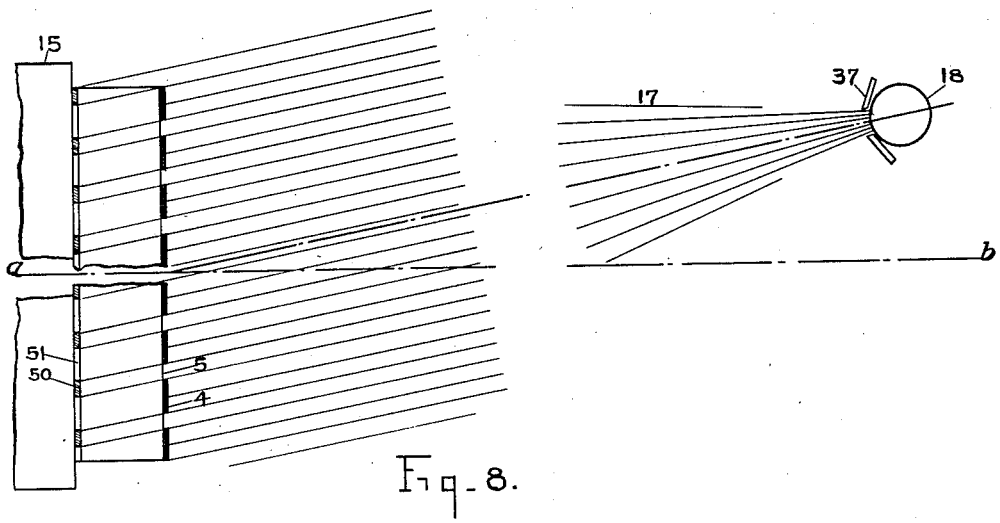
Figures 9 and 10 are edge and face views, respectively, of the film after the first lines have been printed thereon, Figure 10 being viewed in the direction of the arrow 10 of Figure 9.
Figure 10:
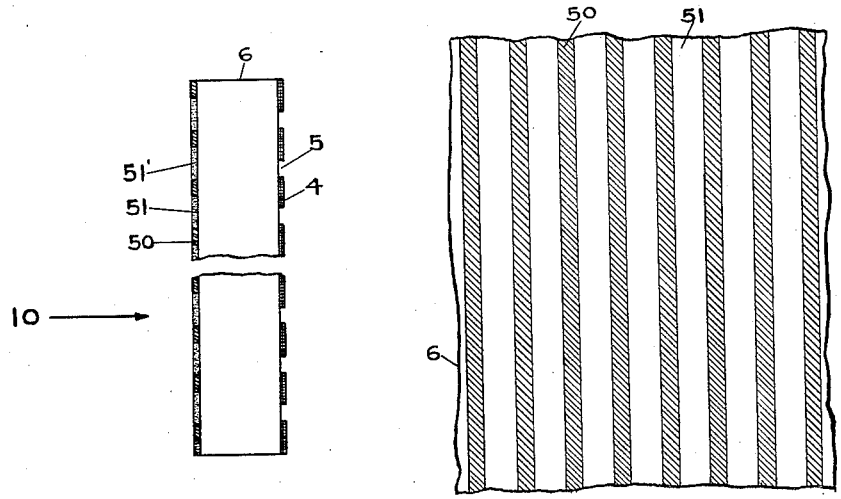

In printing these first lines, the light is preferably moved to the position indicated by dotted lines in Figures 2 and 8, that is, to the extent of movement at the upper side of the median line indicated by the letters a, b in the latter figure. The printing is thus effected at an angle and after the printing the film has formed thereon exposed portions 50 and unexposed portion 51, indicated by the stippling 51' in Figure 9, these latter being twice the width of the former. After exposure, the film is washed to remove the soluble unexposed areas 51, is mordanted and then dyed with one of the primary colors, as, for instance, green, washed and dried. The film as this stage of the process is that shown in Figure 9, having a series of green lines on one side and the sub-master or model on the other, it being understood that the unexposed gelatin has been entirely removed from the areas 51.

Figure 11:
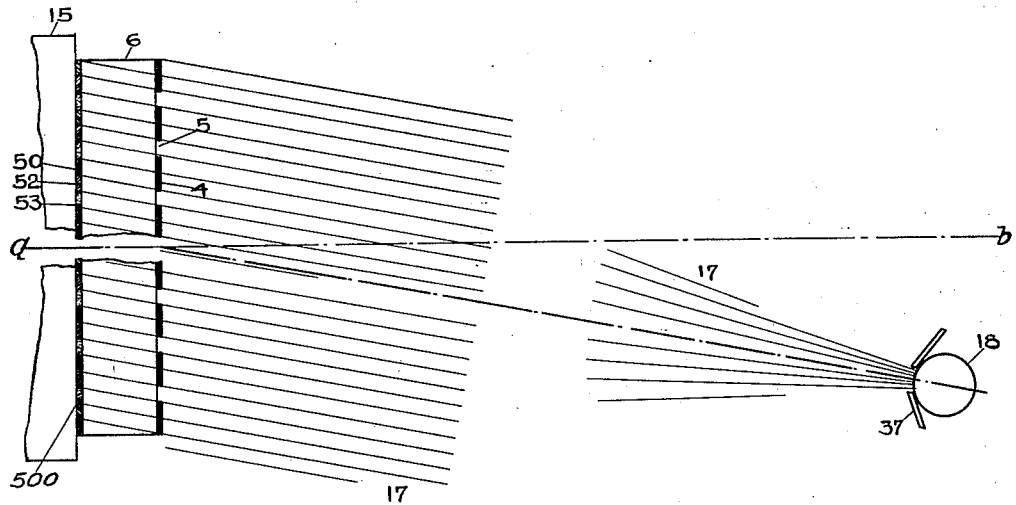
Figure 11 is a diagrammatic showing of the position of the light during the printing of the second lines on the sensitized face of the film, the light being shown as shifted to obtain the correct parallax angle, and the second lines being shown as printed, the lines being shown in edge view.
Figure 13:
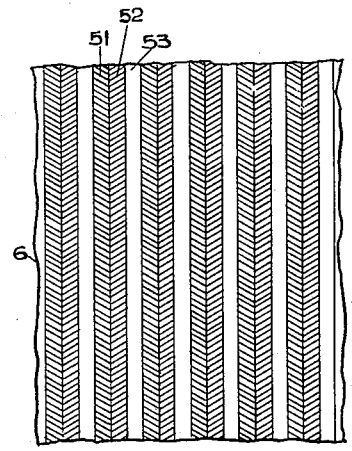
Figure 13 is a face view of the film shown in Figure 12 looking in the direction of the arrow 13 of that figure.

The film roll is again sensitized on the side opposite the sub-master with a light sensitive substance as bichromated gelatin and dried, and again inserted in the machine on the spindle 8 and passed over the cylinder 15 to effect the printing of the second lines, which printing is done through the film. It will be understood that this light, sensitive coating marked 500 overlies the lines already printed, as shown in Figure 11, but when the exposure is made the printed and dyed lines protect this coating and prevent its exposure, so that when the film is again washed, this coating is removed at those points. In the particular embodiment of the invention shown these second lines are printed in juxtaposition to the first lines, though it will be understood that under certain circumstances the second lines may be printed intermediate of the lines 50 first printed. To effect the printing of the second lines a relative movement of the light source and film is produced so as to cause the light to pass through the film at an angle different from the angle at which the first printing was effected, whereby a portion of the blank areas 51 left at the first printing will now be unprotected by the opaque spaces of the sub-master or model and a printing of such spaces will be effected. To accomplish this, preferably for convenience, the light source is shifted to the opposite extreme of the median line $a, b$, thereby causing the light rays to be thrown against the film at an angle different from the first printing. The amount of the shifting of the light source is such as to cause the light rays to effect a printing of one-half of the unprinted portions or areas 51, this printing taking place in juxtaposition to the lines 50 already printed, as it clearly shown in Figures 11 and 13, the second lines being marked 52, and the remaining spaces unaffected by the light being marked 53. The exposed film with the second lines printed thereon is then washed to remove unexposed soluble gelatin from over the first printed lines 51 and the areas 53, mordanted and dyed with a second primary color, such as red, washed and dried.

Figure 12:
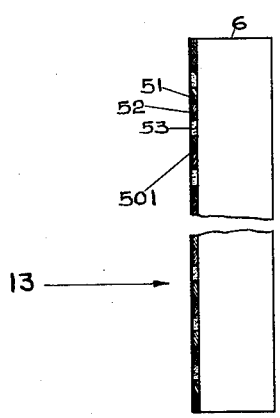
Figure 12 is an edge view of the film with the two lines printed thereon in juxtaposed position, the sub-master or model having been removed from the film.

The film at this stage of the process is in the condition shown in Figure 12, having a plain back, and red and green lines arranged in juxtaposition to each other on the face thereof with a blank space equal in width to one of the lines interposed between two of the printed lines. The rolled film is again in sensitized with a light sensitive substance, as bichromated gelatin, and dried and again passed through the machine supported from the spindle 8 over the cylinder 15 for the third printing through the film. This third coating is marked 501 and covers the two lines already printed and the unprinted areas as indicated in Figure 14. As the red and green lines already printed protect the sensitive coating over them, it is necessary for this third printing only to expose the gelatin coating covering the blank portions 53 left by the second printing, and this is effected as illustrated in Figure 14, by moving the light rays to a position on the median line $a, b$. After the final printing, the film is again washed to remove soluble gelatin, mordanted and dyed with a third primary color, as, blue, marked 53$^a$, washed, dried and varnished with any suitable transparent waterproof varnish, such as thin collodion, indicated by the line 502 in Figure 15.

As before stated, the film is made of any desired width up to the limits of the machine and may now be sensitized with any suitable emulsion, as a panchromatic emulsion indicated by the line 504 in Figure 15, and cut by any suitable cutting and spooling mechanism to the desired width for use.

The various driven rolls and cylinders may, of course, be driven by any suitable driving mechanism, which has not been shown, it being unnecessary for an understanding of the invention. With the apparatus described, a lined color screen film with the lines properly arranged may be produced in a continuous manner, ready for use either as a negative or positive screen film for the production of pictures in natural colors.

While the invention has been shown and described in its preferred form, it will be understood that various changes may be made in the specific construction and arrangement of the printing mechanism and that the invention is not to be limited to the exact construction shown and described.

What I claim is:

1. In an apparatus for photographically printing a pattern on a continuous sensitized support, the combination of a light source, means for continuously moving the support past the light source, and means for effecting a relative movement of the support and the light source.

2. In an apparatus for photographically printing a pattern on a sensitized support, the combination of a light source, means for moving the support past the light, and means for effecting a relative movement of the support and the light source.

3. In an apparatus for photographically printing a pattern on a continuous sensitized support, the combination of a light source, means for continuously moving the support past the light, and means for effecting a relative angular movement of the support and the light source.

4. In an apparatus for photographically printing a pattern on a sensitized support, the combination of a light source, means for moving the support past the light, and means for effecting a relative angular movement of the support and the light source.

5. In an apparatus for photographically printing a pattern on a continuous sensitized support, the combination of a light source, means for continuously moving the support past the light, and means for effecting a movement of the light relatively to the support.

6. In an apparatus for photographically printing a pattern on a continuous sensitized support, the combination of a light source, means for continuously moving the support past the light, and means for effecting a relative angular movement of the light source with respect to the support.

7. In an apparatus for photographically printing a pattern on a continuous sensitized flexible support, the combination of a light source, a printing cylinder around which the support is led with the sensitized surface away from the light, a reel on which the support is wound after printing, and means for effecting a relative movement of the support and the light source.

8. In an apparatus for photographically printing a pattern on a continuous sensitized support, the combination of a light source, a printing cylinder around which the flexible support is drawn with the sensitized surface away from the light, a reel on which the flexible support is wound after printing, a protecting apron wound with the support, and means for effecting a relative movement of the support and the light source.

9. In an apparatus for photographically printing a pattern on a continuous sensitized support, the combination of a pivoted light source, means for continuously moving the support past the light, and means for moving the light support on its pivot for effecting an angular adjustment of the light with respect to the support.

10. In an apparatus for photographically printing a pattern on a continuous sensitized support, the combination of a pivoted light source, means for continuously moving the support past the light, means for moving the light support on its pivot for effecting an angular adjustment of the light with respect to the support, and stops for stopping the movement of the light in a predetermined position.

In testimony whereof, I have hereunto set my hand.

JOHN H. POWRIE.